2,928,498

METHOD OF ABSORBING THE SPRAY OF ORGANIC LIQUIDS IN SPRAYING CHAMBERS

Theodor Schmid-Nisoli, Basel, Gottfried Duerig, Muttenz, and Adolf Paul, Oberwil, Switzerland, assignors to Ciba Limited, Basel, Switzerland, a Swiss firm No Drawing. Application May 13, 1958
Serial No. 734,864

Claims priority, application Switzerland May 24, 1957

13 Claims. (Cl. 183—115)

In some industrial plants it is necessary to produce a fine spray of an organic liquid, and it is impossible to prevent a certain amount of the spray mist from not reaching the object to be sprayed and being distributed in the workroom, whether large or small, from which it should, if possible, be removed rapidly and thoroughly. A typical example of a plant in which these conditions exist is a paint spraying plant, especially a lacquer spraying chamber.

In the usual lacquer spraying chambers the extremely fine particles of lacquer or paint, which do not strike the articles to be sprayed, are collected by means of special filters, which generally consist of fine wood shavings. With the development of high quality artificial resin lacquers, which usually contain highly inflammable solvents, lacquer spraying chambers are used in which the fine lacquer particles are absorbed by a shower of water and means provided for washing out the mist.

The replacement of dry filters of the ventilation system by a water shower and mist washing has important advantages, namely (a) The danger of fire is kept to a minimum.

(b) The troublesome lacquer mist which is injurious to health is absorbed by washing it away so that the mist cannot accumulate.

(c) Less costly operation, since the need to exchange dry filters does not arise.

(d) Lower maintenance costs, since the soiling of the chambers and especially of the ventilation system is minimised.

(e) Cleaner working.

In the case of certain types of lacquers the lacquer particles separate out in the circulation bath and agglomerate, and the sticky particles become deposited on the walls of the apparatus and in the water circulation and ventilation system, so that in a short time it becomes necessary to put the chambers out of operation for overhaul.

In order to overcome these difficulties it has been proposed to line the chambers with a silicone film, which can easily be removed when lacquer is deposited thereon. However, this expedient does not solve the problem arising from the deposition of lacquers in the pipes of water circulation and ventilation systems.

It has also been proposed to add to the washing liquor used in spraying chambers an easily water-soluble neutral salt, especially one containing a polyvalent anion or cation.

The object of that method is to recover the sprayed lacquer or paint, for which purpose the lacquer should coagulate immediately it enters the water. Where recovery is not possible, for example, because a given lacquer is used for a relatively short time or recovery is not profitable for other reasons, the immediate precipitation of the lacquer in the sprayed water merely makes the working conditions more difficult, which should be avoided as far as possible. An object of the present invention is to remedy these difficulties.

The present invention is based on the observation that the absorption of the spray of an organic liquid by surface contact with water in lacquer spraying chambers is considerably improved by using water which contains an at least swellable organic protective colloid for the absorption of the organic liquid.

As an at least swellable organic protective colloid there is advantageously used one which is soluble in water. As examples of protective colloids there may be mentioned casein, glue, gelatine, agar agar and alginates. Especially advantageous are cellulose ethers such as methyl-, ethyl- or hydroxyethyl-cellulose, and preferably carboxy alkyl-celluloses containing an alkyl-carboxylic acid group of low molecular weight, for example, carboxyethyl-celluloses or corboxymethyl-celluloses, which contain sufficient ether groups to render the cellulose derivative soluble in water, that is to say, celluloses in which about 10–60% of the hydroxyl groups are etherified.

Instead of a single organic protective colloid two or more such colloids may be added to the water. Other substances may also be added to the water, for example, inorganic compounds of alkaline reaction, for example, alkali metal phosphates, and especially compounds of alkaline reaction which themselves act as protective colloids, such as alkali metal silicates.

It is also usually of advantage to add a dispersing agent to the water. There may be used non-ionic or ion-active dispersing agents. As non-ionic dispersing agents there come into consideration, more especially, ethylene oxide addition products, for example, of alcohols of high molecular weight or para-hydroxyalkyl-benzenes. Among the ionic dispersing agents there may be mentioned the known alkyl sulfates or alkyl sulfonates, alkali metal salts of sulfonic acids of 2-alkyl-N-benzyl-benzimidazoles containing an alkyl group of high molecular weight, and also salts of teritary alicyclic amines with fatty acids of high molecular weight.

When necessary, foaming of the washing water can easily be prevented or reduced to a permissible value, by the addition of an anti-foaming agent. For this purpose the usual agents, for example, aliphatic alcohols such as octanol, may be used. In some cases petroleum, alone or together with another anti-foaming agent, is useful for this purpose.

The proportion of protective colloid to be added to the water, and of any other additions, may vary within wide limits. A greater or smaller proportion is used depending on whether a large or small amount of the organic liquid is to be absorbed in unit time, whether the water is to be suitable for use for a long time or is to be frequently renewed, whether the liquid to be absorbed has a tendency to coagulate rapidly and/or to contaminate the apparatus, and whether subsequent additions of swelling agent are contemplated during operation, the proportion also being dependent on obtaining a good action coupled with economy in the use of the additions.

As stated above it is in some cases desirable to make subsequent additions to the washing water of protective colloid and other additions, when used, and the quantities subsequently added may, of course, be small in relation to the quantity first added.

By means of the improvement of this invention it is possible to keep the water used for absorbing the organic liquid in use for long periods without excessive quantities of organic substances being deposited in the circulation or ventilation system or contaminating the storage vessel for the water. The deposition of lacquer on the wall behind the shower of water is also suppressed, because the fine particles of the organic substance, probably due to the increased surface tension of the water, do not pass through the shower of water and so cannot stick to the rear wall, which remains free from deposits for very long periods, which is not the case when water alone is used. In this way undisturbed operation for long periods is ensured, without having to interrupt the operation for cleaning purposes or for replacing the circulating water.

It has also been found that, when the organic substance absorbed by the water ultimately begins to separate out, this occurs principally at places where the water is substantially quiescent, that is to say, in the storage vessel for the water. However, it is a relatively simple matter to remove from time to time the accumulated organic substance which is either at the bottom of the vessel or floats on the water.

The following examples illustrate the invention, the parts and percentages being by weight.

Example 1

To the water, which is to be charged into a washing appliance of the usual construction for irrigating the wall of a spraying chamber, are added 0.5% of the sodium salt of a carboxy-methyl-cellulose in which about 27% of the hydroxyl groups are etherified, 0.05–0.1% of a solution of about 25% strength of a reaction product of 8 mols of ethylene oxide per mol of para-tertiary-octyl-phenol and, if desired, 0.05% of a foam inhibitor. After every 8 hours of working time a further 0.015% of the salt of carboxymethyl-cellulose and a 0.01% of the ethylene oxide condensation product are added. If the water spray foams too much, nothwithstanding the addition of the foam inhibitor, the volume of foam can be reduced to a permissible value by means of petroleum.

In this manner spray chambers can be kept in a usable condition for long periods without excessive quantities of lacquer particles becoming deposited in the water circulation system or the ventilation system or collecting on the bottom of the storage vessel for the water.

Example 2

To the water to be used for spraying a lacquer spraying chamber are added, per 1000 parts of water, 5 parts of the sodium salt of a carboxy methyl-cellulose in which about 27% of the hydroxyl groups are etherified, 2 parts of sodium silicate solution of 22% strength and 0.1 part of dimethyl-cyclohexylamine oleate. Daily additions (after working periods of 8 hours) of 0.5 part of the sodium salt of the carboxymethyl-cellulose, 0.05 part of the sodium silicate solution and 0.7 part of dimethyl-cyclohexylamine oleate are made.

The rinsing liquor of the above composition is also very effective for long periods against very greasy and soiling lacquers, such as asphalt, carbon black lacquers and certain synthetic resin lacquers. In this case also foaming may be combatted by the addition of petroleum. The separation of excess lacquer occurs principally in the storage vessel, and usually on the surface of the water, so that the separated lacquer can be removed from time to time without much trouble. It has been found that such a liquor remains active for long periods of hard use without causing any trouble, nad needs renewing only after several months.

Example 3

To the water to be used for washing a lacquer spraying chamber there are added, per 1000 parts of water, 10 parts of methyl-cellulose, 1 part of dimethy-cyclohexylamine oleate and 0.5 part of a reaction product of 8 mols of ethylene oxide per mol of para-tertiary octyl phenol. This liquor has the same action as the liquor described in Example 1.

Example 4

2.5 parts of hydroxyethyl-cellulose are dissolved in 1000 parts of water, and there are added to the solution 1 part of sodium silicate solution of 22% strength and 1 part of dimethyl-cyclohexylamine oleate. A washing liquor of this composition has the same action as that described in Example 1.

What is claimed is:

1. In the absorption of the spray of organic liquids in lacquer spraying chambers by surface contact with water the improvement which comprises using, for absorbing the spray of the organic liquids, water which contains a water-soluble cellulose ether of an aliphatic hydroxy compound of low molecular weight.

2. In the absorption of the spray of organic liquids in lacquer spraying chambers by surface contact with water the improvement which comprises using, for absorbing the spray of the organic liquids, water which contains a water-soluble carboxyalkyl-cellulose derived from an aliphatic hydroxy carboxylic acid of low molecular weight.

3. In the absorption of the spray of organic liquids in lacquer spraying chambers by surface contact with water improvement which comprises using, for absorbing the spray of the organic liquids, water which contains a water-soluble alkali metal salt of a highly etherified carboxyalkyl-cellulose derived from an aliphatic hydroxy carboxylic acid of low molecular weight.

4. In the absorption of the spray of organic liquids in lacquer spraying chambers by surface contact with water improvement which comprises using, for absorbing the spray of the organic liquids, water which contains a water-soluble cellulose ether of an aliphatic hydroxy carboxylic acid of low molecular weight and also an alkali metal silicate.

5. In the absorption of the spray of organic liquids in lacquer spraying chambers by surface contact with water improvement which comprises using, for absorbing the spray of the organic liquids, water which contains a water-soluble cellulose ether of an aliphatic hydroxy carboxylic acid of low molecular weight and also at least one dispersing agent.

6. In the absorption of the spray of organic liquids in lacquer spraying chambers by surface contact with water improvement which comprises using, for absorbing the spray of the organic liquids, water which contains a water-soluble cellulose ether of an aliphatic hydroxy carboxylic acid of low molecular weight and also an ion-active dispersing agent.

7. In the absorption of the spray of organic liquids in lacquer spraying chambers by surface contact with water the improvement which comprises using, for absorbing the spray of the organic liquids, water which contains a water-soluble cellulose ether of an aliphatic hydroxy carboxylic acid of low molecular weight and also a salt of a tertiary alicyclic amine with a fatty acid of high molecular weight.

8. In the absorption of the spray of organic liquids in lacquer spraying chambers by surface contact with water the improvement which comprises using, for absorbing the spray of the organic liquids, water which contains a water-soluble cellulose ether of an aliphatic hydroxy carboxylic acid of low molecular weight and also a non-ionic dispersing agent.

9. In the absorption of the spray of organic liquids in lacquer spraying chambers by surface contact with water the improvement which comprises using, for absorbing the spray of the organic liquids, water which contains a water-soluble cellulose ether of an alphatic hydroxy carboxylic acid of low molecular weight and also a polyglycol ether derivative.

10. In the absorption of the spray of organic liquids in lacquer spraying chambers by surface contact with water the improvement which comprises using, for absorbing the spray of the organic liquids, water which contains the sodium salt of a highly etherified carboxy methyl-cellulose and also a reaction product of about 8 mols of ethylene oxide per mol of para-tertiary-octyl-phenol.

11. In the absorption of the spray of organic liquids in lacquer spraying chambers by surface contact with water the improvement which comprises using, for absorbing the spray of the organic liquids, water which contains the sodium salt of a highly etherified carboxy methyl cellulose and also sodium silicate and dimethyl-cyclohexylamine-oleate.

12. In the absorption of the spray of organic liquids in lacquer spraying chambers by surface contact with water the improvement which comprises using, for absorbing the spray of the organic liquids, water which contains water-soluble methyl-cellulose and also dimethyl-cyclohexylamine oleate and a reaction product of about 8 mols of ethylene oxide per mol of para-tertiary octyl phenol.

13. In the absorption of the spray of organic liquids in lacquer spraying chambers by surface contact with water the improvement which comprises using, for absorbing the spray of the organic liquids, water which contains water-soluble hydroxy-ethyl-cellulose and also sodium silicate and dimethyl-cyclohexylamine-oleate.

References Cited in the file of this patent

UNITED STATES PATENTS

| | | |
|---|---|---|
| 2,188,439 | Kirkpatrick | Jan. 30, 1940 |
| 2,207,774 | Barthelmy | July 16, 1940 |
| 2,362,964 | Affleck | Nov. 21, 1944 |

FOREIGN PATENTS

| | | |
|---|---|---|
| 435,351 | Great Britain | Sept. 19, 1935 |